Oct. 17, 1950
W. A. ASHTON
2,526,060
HARNESS RACE STARTING GATE
Filed Aug. 20, 1946
5 Sheets-Sheet 1
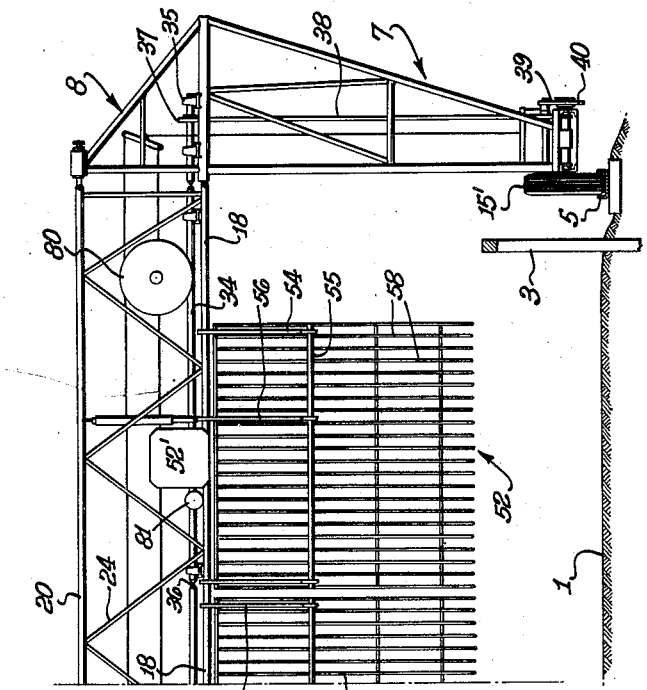
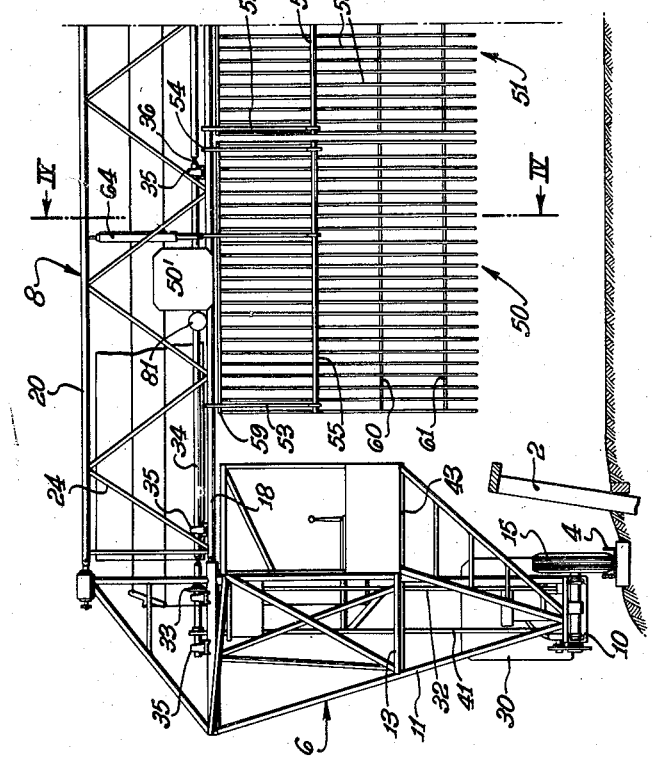
Fig. 1.
Willard Andrew Ashton
INVENTOR.
BY
ATTORNEY.

Oct. 17, 1950          W. A. ASHTON          2,526,060
HARNESS RACE STARTING GATE
Filed Aug. 20, 1946                    5 Sheets-Sheet 2
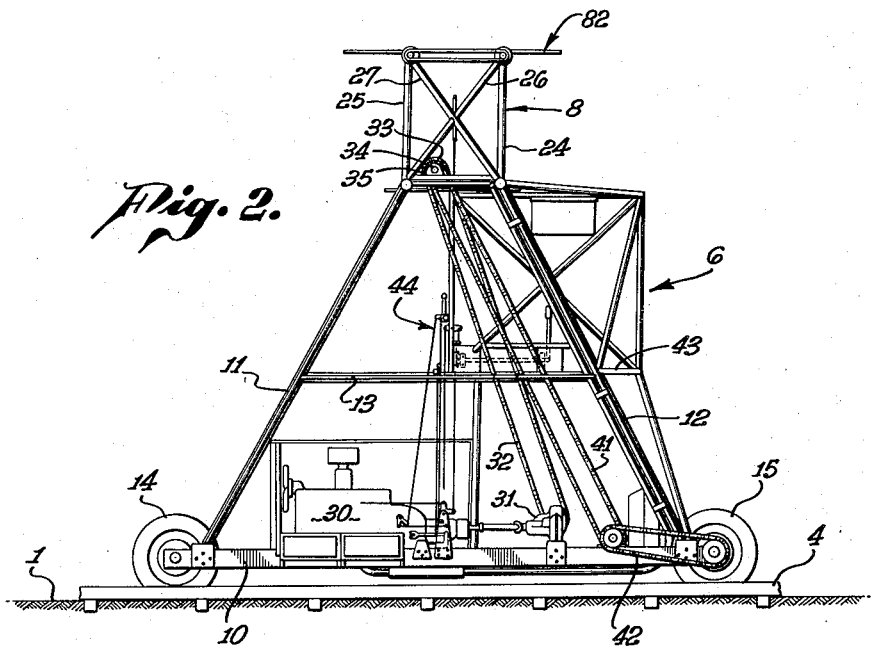
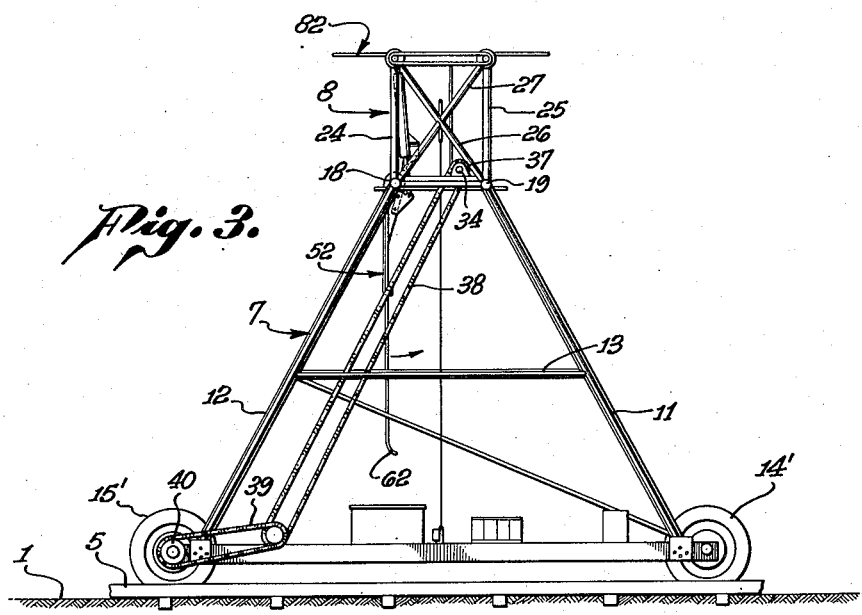
Willard Andrew Ashton
INVENTOR.
BY
ATTORNEY.

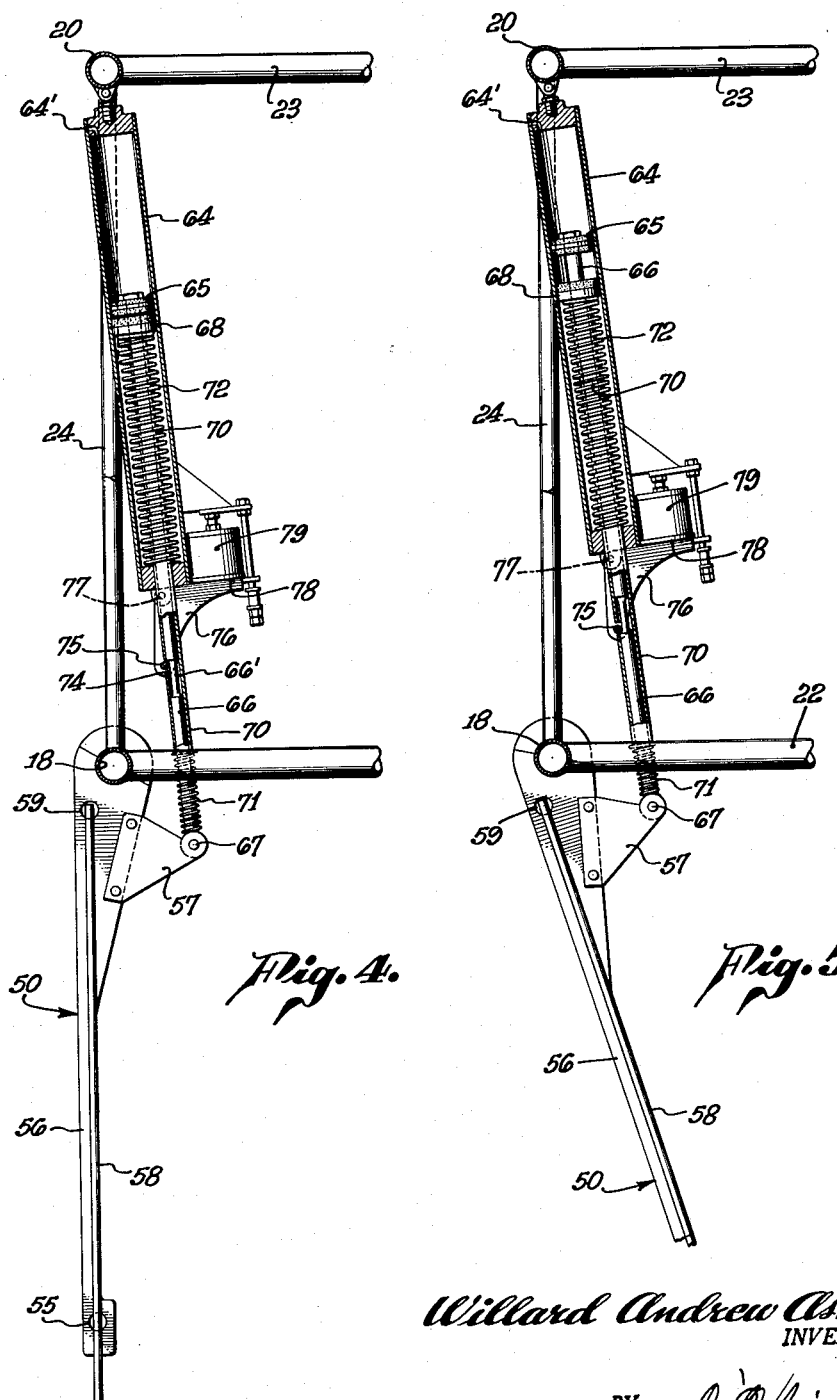

Oct. 17, 1950      W. A. ASHTON      2,526,060
HARNESS RACE STARTING GATE

Filed Aug. 20, 1946      5 Sheets-Sheet 4

Willard Andrew Ashton
INVENTOR.

BY

ATTORNEY.

Oct. 17, 1950 W. A. ASHTON 2,526,060
HARNESS RACE STARTING GATE
Filed Aug. 20, 1946 5 Sheets-Sheet 5
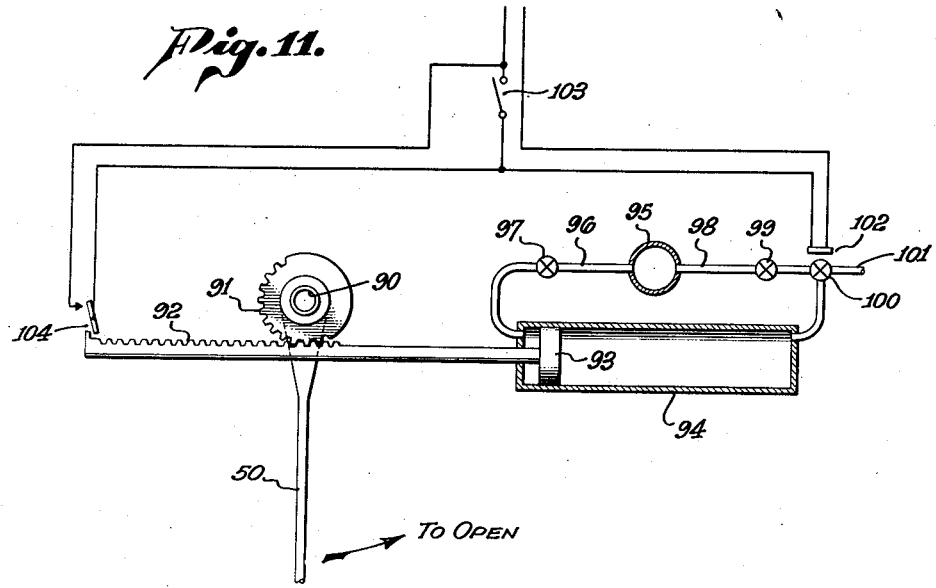
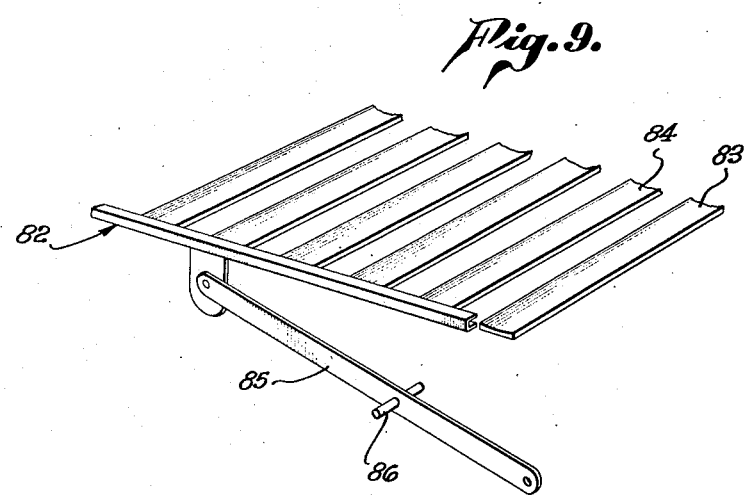
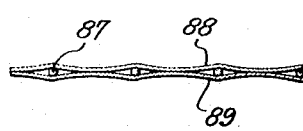
Willard Andrew Ashton
INVENTOR.
BY
ATTORNEY Patented Oct. 17, 1950

2,526,060

UNITED STATES PATENT OFFICE 2,526,060

HARNESS RACE STARTING GATE

Willard A. Ashton, Los Angeles, Calif., assignor to Western Harness Racing Association, Los Angeles, Calif., a corporation of California Application August 20, 1946, Serial No. 691,828

4 Claims. (Cl. 119—15.5)

This invention pertains to a method of starting or initiating harness races whereby the difficulty heretofore encountered in obtaining a reasonably satisfactory alignment of the entries as the starting line is crossed, is eliminated. The invention is also directed to an improved type of starting gate particularly adapted for use in harness racing.

Heretofore harness racing has not met with a great deal of popular interest because of the many false starts involved and the apparent impossibility of getting the various entries into a semblance of alignment at the start of a race. Harness racing distinguishes from most forms of horse racing in that the entries mill about and get into their pace before heading down the track toward an imaginary starting line, so that the entries are moving rapidly at the time they cross the starting line. The drivers often attempt to place themselves in a more advantageous position while making their run for the starting line and ragged, uneven starts which require recall of the field are prone to occur, thereby delaying the race and causing the audience to lose interest.

Generally stated, the method of the present invention contemplates positioning a starting gate including a barrier across the track at a point spaced from a fixed starting line and behind such starting line and then driving the device or gate along the track toward the starting line at a controllable speed so that the various entries are prevented from passing the moving barrier. As a result, all of the entries are given an opportunity of moving in close proximity with the moving barrier and in aligning themselves. When the starting line is reached, or whenever the official starter is of the opinion that the entries are in satisfactory alignment, the barrier is rapidly raised and the moving gate stopped, thereby permitting the various entries to begin their race on a substantially equal footing.

The apparatus of the present invention comprises a pair of end frames capable of being driven at a controllable speed along runways exteriorly of the guard rails or fences defining the borders of the race track. These end frames are connected by means of an overhead beam which carries one or more gates or barriers capable of moving from a substantially vertical position transverse to the track to a virtually horizontal position well above the track, such movement being rapid and under the control of the official starter who may be located in one of the end frames. In its preferred form the barrier may be yieldingly held in the substantially vertical position so that a horse catching up with the moving barrier and pressing thereagainst will encounter a resilient or yielding resistance and impart a partially pivotal movement to the gate without tripping the mechanism and causing the gate to automatically open and fully pivot upwardly. If, however, the horse happens to be a runaway and presses against the gate with considerable force so as to cause the gate to pivotally move beyond a predetermined limit, the gate will be tripped and fully opened so as to prevent injury to the horse.

Moreover, since thoroughbreds are extremely sensitive and in many instances readily frightened, means have been provided whereby the overhead beam will cast but a light, indistinct or diffused shadow, and not a dense shadow which may cause the horse to deem the shadow an obstacle, attempt to jump thereover, and thereby break its pace.

It is an object of the present invention, therefore, to disclose and provide methods of starting harness races which will be free from the difficulties encountered heretofore.

An object of the invention is to disclose and provide a method of starting harness races whereby the various entries may move toward a moving gate and a stationary starting line and align themselves properly before the race is actually initiated.

It is an object of the invention to disclose and provide a mobile starting gate.

A further object of the invention is to disclose and provide a novel construction and arrangement of elements whereby a starting gate provided with a barrier may be controllably driven along a race track.

A still further object of the invention is to disclose and provide an improved means and mechanism whereby harness races may be effectively started without causing accidental injury to any of the participating entries.

These and various other objects of the invention will become apparent to those skilled in the art from the following description of exemplary forms of devices embraced hereby. In order to facilitate understanding, reference will be had to the appended drawings, in which:

Fig. 1 is a rear elevation of a starting gate embodying the present invention.

Fig. 2 is a view of the left end of the gate illustrated in Fig. 1.

Fig. 3 is an elevational view of the right end of the device shown in Fig. 1.

Figs. 4 and 5 are vertical sections taken approximately along the plane IV—IV of Fig. 1 showing the barrier-actuating mechanism in two positions.

Figure 9 is a fragmentary perspective view of the light diffusing means.

Figure 10 is a fragmentary sectional view of an alternate screen construction.

Fig. 11 is a schematic representation of an alternate type of gate-actuating mechanism and controls therefor.

Figure 6:
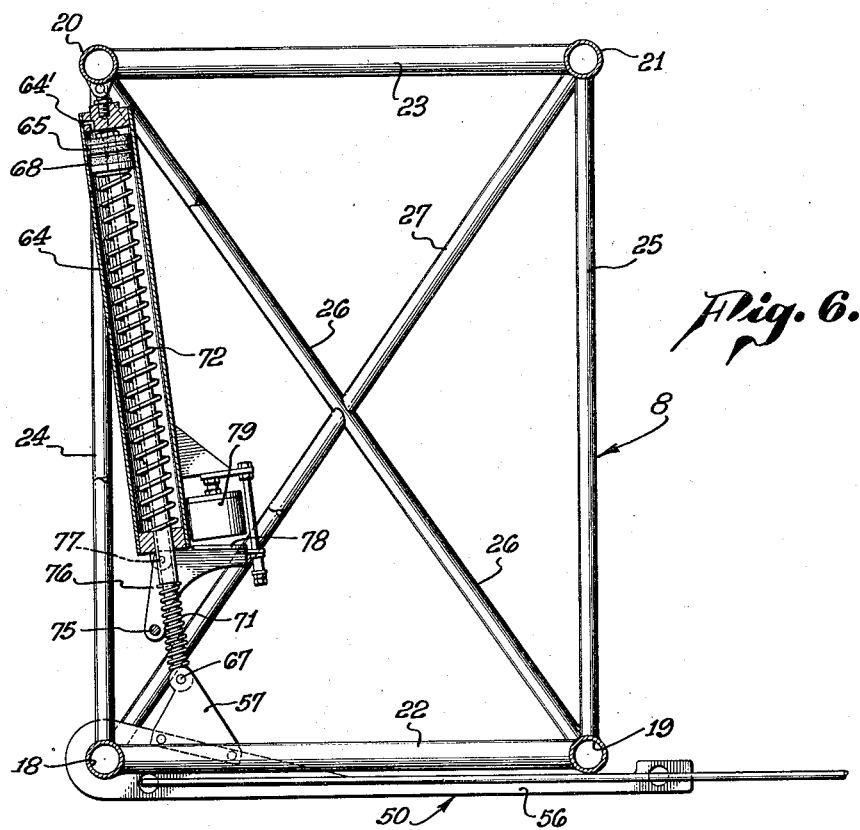
Fig. 6 is an enlarged sectional view of the barrier actuating mechanism showing the position assumed by the actuating mechanism when the barrier is fully raised.

The relationship of the device of this invention to a race track is well illustrated in Fig. 1, wherein the track itself is indicated at 1 with side rails 2 and 3 forming the inner and outer boundaries of the track. Paralleling the rails 2 and 3 and exteriorly thereof, narrow runways are provided such as, for example, the runways or channels 4 and 5. These runways extend rearwardly from the region of a starting line and in operation the entire device is placed upon the runways 4 and 5 at a point to the rear of the starting line so that in its movement it will progress in advance of the horses toward the starting line.

The entire device, hereafter called the starting gate, is composed in essence of a pair of end frames generally indicated at 6 and 7 having their upper ends connected by means of a trussed beam generally indicated at 8. It will be noted, therefore, that the beam 8 extends transversely of the race track and is positioned a considerable distance above the level of the track.

The end frames 6 and 7 are best shown in Figs. 2 and 3. As there shown, each of the end frames may comprise a vertical, broad-based, A-shaped framework. In the end frame shown in Fig. 2 a base member 10 is provided with the upwardly and inwardly inclined members 11 and 12 suitably connected at the top and an intermediate position as by an element 13. Obviously the vertical elements 11 and 12 may be duplicated and any suitable rigid and preferably lightweight structure may be employed.

Each end frame is provided with aligned wheels adapted to run along a runway. For example, the horizontally disposed member 10 may have front and rear wheels 14 and 15 suitably mounted thereon, whereas the end frame 7 is provided with the front and rear wheels 14' and 15'.

The beam 8 which connects the upper ends of the frames 6 and 7 is preferably a trussed, open-work beam. As shown in the drawings, and particularly in Fig. 6, such beam may be composed of a plurality of parallel, tubular members 18, 19, 20, and 21 arranged in pairs, the members 18 and 19 being connected by horizontal elements 22, whereas the upper members 20 and 21 are connected by horizontally disposed elements 23. The upper and lower members 20 and 18 may be interconnected by zig-zag truss elements such as 24; and upper and lower elements 21 and 19 may be connected by similar zig-zag elements 25. In addition, diagonal braces such as 26 and 27 may be employed in order to impart rigidity to the beam, since the span thereof may vary with the width of the race track and may range from ninety to one hundred and twenty feet or more.

One of the end frames, such as the end frame 6, may carry a power means such as the motor 30, and means are provided for transmitting power from the motor to one of the wheels on each of the frames for propelling the entire gate along the runways 4 and 5. In the example given, the drive shaft of the motor 30 leads to a gear box 31 and from a jack shaft of such gear box power is transmitted as by means of a chain 32 to a sprocket 33 mounted upon a sectional shaft carried by the beam 8, the shaft being indicated at 34. The shaft is mounted in suitable bearings 35 and is periodically provided with adjustable flexible couplings as at 36 so that the shaft may be readily raised, kept in operating alignment. The couplings 36 may be of any conventional type having means for raising or lowering the coupling with respect to its support. In the present instance, the coupling 36 is preferably of the flexible type because of the length of the shaft 34. The provision of such a coupling provides means for readily aligning the shaft in case of sagging or other distortion of the relatively long beam 8. The other end of the shaft 34 may transmit power through a sprocket 37 and chain 38 to a countershaft and then by means of chain 39 to a suitable driving sprocket 40 mounted upon the shaft of wheel 15'. A similar chain 41 may extend from the cross shaft 34 and sprocket carried thereby to a countershaft mounted upon the frame 6 so that power may be transmitted from such countershaft as by chain 42 to the shaft upon which the wheel 15 is mounted. By the arrangement thus shown it is evident that the wheels 15 and 15' will be driven in the same direction and at the same speed, thereby causing the entire gate to travel with the beam transverse to the track.

The frame 6 may carry a suitable structure having the floor 43 to accommodate an operator, starter, and other officials, if desired. Various controls 44 may be mounted in a suitable location on such platform 43 so that the operator may control the motor 30 from such vantage point and start, stop and change the speed of the entire gate at will.

The starting gate may carry one or more barriers. In actual practice it has been found desirable to carry a plurality of adjoining barriers and although means are provided for actuating all of the barriers simultaneously, the operation, repair and use of the starting gate is enhanced by the provision of a plurality of barriers.

By referring to Fig. 1 a barrier is indicated at 50, a part of another at 51, and still another barrier at 52. These barriers are lightweight, foraminous elements pivotally connected to the beam for movement from a virtually vertical plane transverse to the track to a virtually horizontal plane above the track. Each barrier may be of a width correlated to the width of a sulky or other vehicle being drawn by the horse, and for the purpose of identifying lanes or barriers, a sign or other identifying signal may be carried immediately above each barrier, as for example at 50', 52'.

Each barrier may be pivotally connected to the rear and lower transverse member 18 as by means of end arms 53 and 54, such end arms being connected by one or more tubular elements 55. An intermediate bracket or arm 56 also connected to the cross piece 55 and provided with a side arm 57 may also be pivoted to the transverse member 18.

The rest of the barrier may be composed of a plurality of downwardly extending, spaced, tubular members 58 connected by transverse elements such as 59, 60 and 61. The lower ends of the tubular elements may be curved forwardly as best indicated at 62 in Fig. 3.

Actuating means are carried by the beam 8 and connected to each of the barriers for moving the barriers from their initial, virtually vertical position into a horizontal position. Various means may be employed. The specific form of means illustrated in Figs. 4 to 8 inclusive comprises a spring means capable of being preloaded for instantaneous and simultaneous release. In these figures Fig. 4 shows the arrangement of elements when the barrier 50 is in a preloaded, vertical position; and Fig. 5 illustrates a position capable of being assumed by the barrier under the influence of mechanical pressure applied to the lower portion of the barrier, as for example by an over anxious horse and rider. Fig. 6 illustrates the position of the gate in a fully open, virtually horizontal position.

Each of the barriers may be provided with a separate actuating means, such various actuating means being arranged, however, for simultaneous operation at the will of the starter. In the illustrated form of device, a cylinder 64 is pivotally connected by its upper end to the upper, transverse element 20 of the beam 8 and slidably mounted in such cylinder is a piston 65 carried by the upper end of a rod 66, the lower end of the rod being pivotally connected as at 67 to the bracket or arm 57 attached to the barrier. The piston 65 may be virtually completely withdrawn into the cylinder 64 when the barrier is in fully opened position, as indicated in Fig. 6. One form of construction of the piston 65 is shown in greater detail in Fig. 8 but it is to be understood that the invention is not limited to the precise form of piston there shown.

An actuating piston 68 is also contained within the cylinder 64, this actuating piston being carried by the upper end of a tube 70 shorter in length than the rod 66. The end of the tube 70 may be provided with a flange against which a spring 71 may press, the opposite end of the spring bearing against the arm 57 of the barrier. Normally, therefore, the spring 71 urges the piston 68 against the piston 65 and relative movement may take place between the tube 70 and the rod 66.

Figure 7:
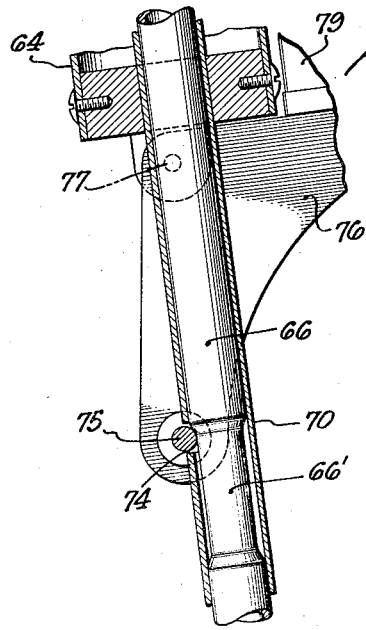
Fig. 7 is an enlarged fragmentary view partly in section of the gate release mechanism.
Figure 8:
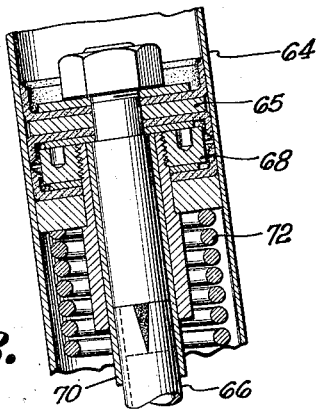
Fig. 8 is an enlarged sectional view of the actuating piston and related parts.

The cylinder 64 contains a heavy spring 72 bearing against the lower side of the piston 68 and normally adapted to raise the piston 68 (and piston 65) to the upper part of the cylinder 64, as indicated in Fig. 6, so as to open the barrier. Releasable means are provided for preloading the spring 72 and the barrier and for holding the barrier 50 in the vertical position indicated in Fig. 4. The latching means illustrated comprises a port or opening 74 formed in the tubular member 70 and capable of receiving a roller, rod, dog, or other latching device 75 carried by a bell crank lever 76 pivotally connected as at 77 to the bottom of the cylinder 64. When the barrier 50 is in its lower, virtually vertical position and the two pistons 65 and 68 are at their lowermost point of travel within the cylinder 64, an area of reduced cross section 66' of the rod 66 is opposite the port 74 of the tubular member 70 so that the latch or dog 75 may readily seat itself in such port, as best shown in Fig. 7. The bell crank lever 76 may carry an armature plate 78 adapted to be held against an electromagnet 79, such electromagnet thereby retaining the roller or latch 75 within the port 74 when the electromagnet is energized. When the current is cut off the bell crank lever 76 pivots upon the point 77, and since the pivotal axis 77 is not in longitudinal alignment with the roller 75 when such roller is seated in the port 74, the thrust of the spring 72 against piston 68 is translated by the tube 70 into an outward displacement of the roller 75, causing the latching device to be released and permitting the rapid pivotal movement into horizontal position.

By employing a round latch bar 75, the latch is an unstable one, readily displaced by the off-center thrust on the tube 70, causing instantaneous release of the actuating means when current supply to electromagnet 79 is discontinued by the starter by movement of a switch (not shown) but preferably located in the end frame 6.

It is to be noted that means have been provided whereby pivotal movement of the barrier by an externally applied force to beyond a predetermined point automatically renders the actuating means operative. If, for example, a horse bears against the barrier while the gate is moving and the barrier is down, the horse will encounter a yielding resistance due to spring 71 and piston 65 will move upwardly (as in Fig 5). An adjustable bleed port 64' is provided for the regulated escape of air from the upper end of cylinder 64. The bleed port 64' may be provided with a needle valve for adjusting the escape of the air from the upper cylinder 64 and thereby regulate the cushioning effect of the air within the cylinder 64 above the piston 65. Upward movement of piston 65 is due to relative movement of rod 66 within tube 70 and the amount of such permissive movement is limited by the length of the reduced section 66'. When the barrier has been pivotally moved to the limit established by 66' and the externally applied force continues, the lower shoulder of the reduced section 66' forces the roller 75 out and the actuating spring 72 immediately raises the barrier. Such raising of the barrier, to prevent injury to the horse, is independent of the control means operated by the starter. In actual practice, the occurrence of the acts just recited would cause the starter to raise all gates, announce that there is "No Start" over public address means 80 carried by the gate (Fig. 1) and energize red stop lights 81 to make certain that the drivers regroup themselves for another start. The public address system and speaker 80 permits the starter to talk to the drivers at all times.

In order to prevent the overhead beam 8 from casting a sharp shadow which a horse may mistake for an obstacle, means have been provided for diffusing light. One form of such means may be carried by the beam as at 82 (Fig. 2) and may comprise a tiltable, movable or shiftable frame capable of extending beyond the beam and carrying light diffracting or diffusing members. Fig. 9 is a fragmentary perspective view of one such type of frame carrying a plurality of longitudinally extending, spaced, translucent and transparent strips 83, 84, respectively provided (in this example) with concave, upper surfaces. Sunlight is thus diffused upon the track, inhibiting the formation of a dense, sharp-edged shadow which might startle a horse.

The entire frame 82 may be supported by lever arms 85 provided with pivots 86, which may be suitably connected to any convenient portion of the beam 8.

In an alternate form the frame 82 may carry a screen 87 (Fig. 10) of relatively large mesh, covered with a translucent material such as a plastic of cellulosic derivative into which the screen has been dipped. Sheets 88 and 89 effectively refract and diffuse the light.

It is not necessary that the barrier be pivoted to a member of the beam; it may be movably attached to a torque tube 90. Fig. 11 illustrates a barrier 50 attached to a torque tube 90 provided with a pinion gear 91 controllably actuated by rack 92 and piston 93 of an air cylinder 94. Compressed air from a manifold 95 is supplied to both ends of the cylinder as by line 96 and pressure regulating valve 97, and by line 98, pressure regulating valve 99 and three-way valve 100 having an exhaust outlet 101. Valves 91 and 99 may be preset so that normally piston 93 is in the position shown and the barrier is down. Valve 100 may be electrically operated as by relay 102 from switch 103 located in the starter's position in the end frame. The starter may, therefore, turn valve 100 so as to connect one end of the cylinder 94 with exhaust 101, thereby permitting pressure supplied through line 96 to rapidly raise the barrier.

In the event a horse bears against the barrier, he will encounter the resilient differential pressure between opposing sides of piston 93, and if he causes more than a motion permitted by trip 104, the circuit to relay 102 is closed and the barrier will open.

It is to be understood that where reference is made to a barrier pivotally connected to an overhead beam, the construction may include a barrier actually connected to an element of the beam or to a torque tube, shaft, hinge pin, or trunnion carried by the beam. Pneumatic or hydraulic actuating means may be used instead of spring actuated means. The beam itself may be constructed in various ways, and although a hollow, openwork type of beam is preferred, a tubular or elliptical beam may be used. Two or more wheels may be mounted on each end frame, and power may be applied to one or more of the wheels. Those skilled in the art, having read the description given herein and being thereby informed as to objects to be attained, will be able to intelligently exercise their knowledge in adapting the present invention and utilizing its teachings. Not all of the various means herein described need be employed simultaneously and various combinations may be used. Certain elements of this invention may be adapted to devices other than starting gates for harness racing. All changes, modifications and adaptations coming within the scope of the appended claims are embraced thereby.

I claim:

1. In combination with a race track having a guard rail defining the track: a narrow runway externally of each guard rail and extending rearwardly from the region of a starting line; a starting gate comprising a pair of vertical, broad-based end frames, each end frame being provided with wheels adapted to run along a runway; a hollow trussed beam connecting the upper ends of the end frames to extend transversely above the track; a lightweight, foraminous barrier pivotally connected to the beam for movement from a virtually vertical plane transverse to the track to a virtually horizontal plane above the track; an arm carried by the barrier; actuating means carried by the beam and connected to the arm for moving the barrier from vertical into horizontal position, comprising a cylinder having one end pivotally connected to the beam, a piston movable in the cylinder and provided with a rod extending from the cylinder, the end of the rod being pivotally connected to the arm, an actuating piston within the cylinder, a tube slidably encircling the rod and attached to said actuating piston, a spring yieldably urging said pistons together, a spring within the cylinder urging the actuating piston upwardly into the cylinder, and a latch cooperating with the tube for holding the actuating piston and spring in loaded position when said barrier is substantially vertical; and the last said means controllable from a point in one of the end frames for releasing the latch.

2. A movable gate for starting harness races, comprising: a pair of vertical broad-based end frames, each end frame being provided with wheels adapted to run along a runway; a hollow trussed beam connecting the upper ends of the end frames to extend transversely above a race track; a lightweight, foraminous barrier pivotally connected to the beam for movement from a virtually vertical plane transverse to the track to a virtually horizontal plane above the track; an arm carried by the barrier; actuating means carried by the beam and connected to the arm for moving the barrier from vertical into horizontal position comprising a cylinder having one end pivotally connected to the beam, a piston movable in the cylinder and provided with a rod extending from the cylinder, the end of the rod being pivotally connected to the arm, an actuating piston within the cylinder, a tube slidably encircling the rod and attached to said actuating piston, a spring yieldably urging said pistons together, a spring within the cylinder urging the actuating piston upwardly into the cylinder, a latch cooperating with the tube for holding the actuating piston and the last said spring in loaded position when said barrier is substantially vertical; and means for releasing the latch.

3. A movable gate for starting harness races, comprising: a pair of vertical broad-based end frames, each end frame being provided with wheels adapted to run along a runway; a hollow trussed beam connecting the upper ends of the end frames to extend transversely above a race track; a lightweight, foraminous barrier pivotally connected to the beam for movement from a virtually vertical plane transverse to the track to a virtually horizontal plane above the track; an arm carried by the barrier; actuating means carried by the beam and connected to the arm for moving the barrier from vertical into horizontal position comprising a cylinder having one end pivotally connected to the beam, a piston movable in the cylinder and provided with a rod extending from the cylinder, the end of the rod being pivotally connected to the arm, an actuating piston within the cylinder, a tube slidably encircling the rod and attached to said actuating piston, a spring yieldably urging said pistons together, a spring within the cylinder urging the actuating piston upwardly into the cylinder, a latch cooperating with the tube for holding the actuating piston and the last said spring in loaded position when said barrier is substantially vertical; means for releasing the latch; and means carried by the rod for independently releasing the latch upon limited predetermined movement of the rod with respect to the tube.

4. In a starting gate for animal races including a pair of vertically extending end frames, on overhead beam carried by said end frames and a foraminous barrier pivotally connected to said beam for swinging about a horizontal axis from a lowered, substantially vertical plane to a raised, substantially horizontal plane, the provision of barrier raising means comprising: an arm fixed to the barrier and projecting laterally therefrom; a cylinder extending downwardly from said beam and pivotally connected thereto for swinging about a horizontal axis; a first piston slidably mounted within the cylinder; a piston rod carried by said first piston, said rod being pivotally connected to said arm; a second piston slidably mounted within the cylinder below said first piston and having a central aperture surrounding said rod; a tube carried by said second piston, said tube extending coaxially of said rod and being slidable relative thereto; an actuating spring within said cylinder urging said second piston upwardly; a latch spring biasing said tube upwardly and said arm downwardly; a releasable latch preventing upward movement of said tube; and means for releasing said latch when said arm is moved upwardly a predetermined distance against the force of said latch spring.

WILLARD A. ASHTON.

REFERENCES CITED

The following references are of record in the file of this patent:

UNITED STATES PATENTS

| Number | Name | Date |
|---|---|---|
| 596,023 | Barrett | Dec. 21, 1897 |
| 647,166 | Stedeker | Apr. 10, 1900 |
| 705,043 | Crowley | July 22, 1902 |
| 1,542,767 | Hassett | June 16, 1925 |
| 2,319,420 | Macksoud | May 18, 1943 |
| 2,365,314 | Whann | Dec. 19, 1944 |

FOREIGN PATENTS

| Number | Country | Date |
|---|---|---|
| 399,912 | Great Britain | Oct. 19, 1933 |